(12) United States Patent
Spitz et al.

(10) Patent No.: US 7,661,596 B1
(45) Date of Patent: Feb. 16, 2010

(54) SYMBOLOGY-BASED SELF-CONFIGURING VERIFIER

(75) Inventors: Glenn S. Spitz, Boulder, CO (US); George Wright, IV, New Canaan, CT (US)

(73) Assignee: Webscan, Inc., Longmont, CO (US)

( * ) Notice: Subject to any disclaimer, the term of this patent is extended or adjusted under 35 U.S.C. 154(b) by 177 days.

(21) Appl. No.: 11/833,975

(22) Filed: Aug. 4, 2007

(51) Int. Cl.
*G06K 7/10* (2006.01)

(52) U.S. Cl. ............ 235/462.42; 235/454; 235/462.01; 235/462.02; 235/462.09; 235/462.14; 235/462.24; 235/462.41; 235/462.45; 235/472.01; 235/472.03; 235/494

(58) Field of Classification Search ............ 235/492.24, 235/455, 462.23, 462.37, 462.32, 454, 462.01, 235/462.06, 462.09, 462.14, 462.24, 462.41, 235/462.42, 462.45, 472.01, 472.02, 494
See application file for complete search history.

(56) References Cited

U.S. PATENT DOCUMENTS

| 5,416,669 | A | 5/1995 | Kato et al. | |
|---|---|---|---|---|
| 5,719,385 | A | 2/1998 | Wike, Jr. et al. | |
| 5,744,790 | A * | 4/1998 | Li | 235/462.24 |
| 6,191,872 | B1 | 2/2001 | DeCaro et al. | |
| 6,216,953 | B1 | 4/2001 | Kumagai et al. | |
| 6,874,639 | B2 | 4/2005 | Lawandy | |
| 6,905,071 | B2 | 6/2005 | Schmidt et al. | |
| 7,001,038 | B2 | 2/2006 | Bock et al. | |
| 7,070,107 | B2 | 4/2006 | Tsikos et al. | |
| 7,219,843 | B2 * | 5/2007 | Havens et al. | 235/462.42 |
| 2002/0158133 | A1 * | 10/2002 | Conzola et al. | 235/462.45 |
| 2004/0173684 | A1 | 9/2004 | Wilz, Sr. et al. | |
| 2006/0097054 | A1 | 5/2006 | Biss et al. | |
| 2007/0176003 | A1 * | 8/2007 | Brock | 235/462.24 |

* cited by examiner

*Primary Examiner*—Thien M. Le
*Assistant Examiner*—Tuyen K Vo
(74) *Attorney, Agent, or Firm*—Island Patent; F. Scott Tierno

(57) ABSTRACT

A self-configuring verifier for performing standardized evaluation and verification of the print quality of a data carrying graphical symbol is structured with a plurality of illumination sources and at least one imaging device. The verifier is capable of automatically determining the symbology of the graphical symbol to be evaluated, and establish a pre-defined illumination pattern and possibly other settings, as required, to satisfy pre-defined evaluation standards. Once the illumination pattern is established and setup is complete, the verifier may fully evaluate and report on the quality of at least one data carrying graphical symbol imaged by the imaging device of the verifier. This abstract is provided to comply with rules requiring an abstract, and is submitted with the intention that it will not be used to interpret or limit the scope and meaning of the claims.

17 Claims, 7 Drawing Sheets

SYMBOLOGY-BASED SELF-CONFIGURING VERIFIER

TECHNICAL FIELD

The presently disclosed invention relates most generally to verifier systems that are structured to verify the print quality of data carrying graphical symbols such as 1-dimensional and 2-dimensional bar code symbols. More particularly, the present invention relates to methods employable with a self-configuring verifier system that will determine and automatically establish a pre-defined illumination pattern required when evaluating one or more data carrying graphical symbols of a specific symbology in order to yield standardized evaluation and verification results.

BACKGROUND

As well understood by skilled persons, when evaluating the print quality of a data carrying graphical symbol, the employed lighting arrangement, which may be termed an 'illumination pattern', may cause captured images to look somewhat different. However, each employed illumination pattern may provide a valid decode. Nonetheless, a respective industry standard may require one of these illumination patterns and not the other(s). For example, when evaluating the print quality of a data carrying graphical symbol such as a barcode or matrix-type symbol, an existing industry standard may require an illumination pattern wherein two illumination sources are arranged to illuminate the graphical symbol from differing overhead locations, say with an incident angle of 45 degrees each. If 'standardized evaluation and verification results' are desired, then this illumination pattern must be employed. Further, due to the different standards that exist, if a verifier apparatus is to be structured to test a plurality of differing symbologies, an individual would typically have to configure and re-configure the apparatus, as dictated by the respective symbology and applicable evaluation standards involved. This may entail, at the least, selecting the type and or configuration of the lighting arrangement to be used. Clearly, this may lead to operator error, possibly producing inaccurate and or compromised evaluation results and reporting.

Accordingly, there is a need for improved self-configuring verifier means, along with methods of operation, that enable a plurality of symbologies to be readily evaluated while virtually eliminating certain setup and illumination configuration errors. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, a self-configuring verifier apparatus is arranged to establish an illumination pattern, based at least in part, on the symbology of a data carrying graphical symbol being evaluated. One simple and preferred embodiment would, for example, determine a 'first-read' decode of the data carrying graphical symbol of interest. This decode may be achieved with all available illumination sources activated, or with only a pre-selected number activated. In addition, a decode may be repeatedly attempted using differing possible illumination patterns, until a successful decode is achieved or all known/available illumination patterns have been tried and exhausted. If no first decode is achieved, an error may be generated and or reported.

Once a first-read decode of the graphical symbol is achieved, the symbology of the decoded graphical symbol has thereby also been determined. Based on the determined symbology, a corresponding pre-defined illumination pattern required for a 'standardized evaluation and verification' may be established by activating certain illumination sources, while possibly not activating others. Once one or more available illumination sources are activated, the data carrying graphical symbol may be imaged (if not already imaged with that illumination pattern), causing discrete image data to be captured. As needed, the image data of the graphical symbol may be utilized (e.g., processed and or analyzed) to determine one or more standardized evaluation and verification results.

Importantly, it should be understood that the first decode is not actually required as a first step. What is required is a determining of the symbology, which will ultimately dictate the required illumination pattern. Further, as appreciated by skilled individuals, a variety of image recognition techniques may be employed for determining the symbology of a respective data carrying graphical symbol. Indeed, the actual best method may be determined by the symbology being 'tested' for. Accordingly, a series of methods or algorithms may be employed to systematically search for the symbology of which the graphical symbol of interest may be a member. In any event, determining the symbology could ultimately be realized by decoding—if indeed the symbol is decodable with any available illumination pattern.

Another notable aspect of the present invention, provides for including a data structure containing illumination and possibly other setup related information, preferably based on or organized by symbology. For example, the data structure may be provided by a local database, which may be established and available on a local computer. This computer may be embedded within the system, or a separate computer housed in a separate chassis. Accordingly, once the symbology is determined (via any symbology revealing activity or event), the local database may be accessed to determine the required illumination pattern, which is preferably automatically established (if not the currently employed illumination pattern utilized for initial imaging and decode activities).

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

Figure 1:
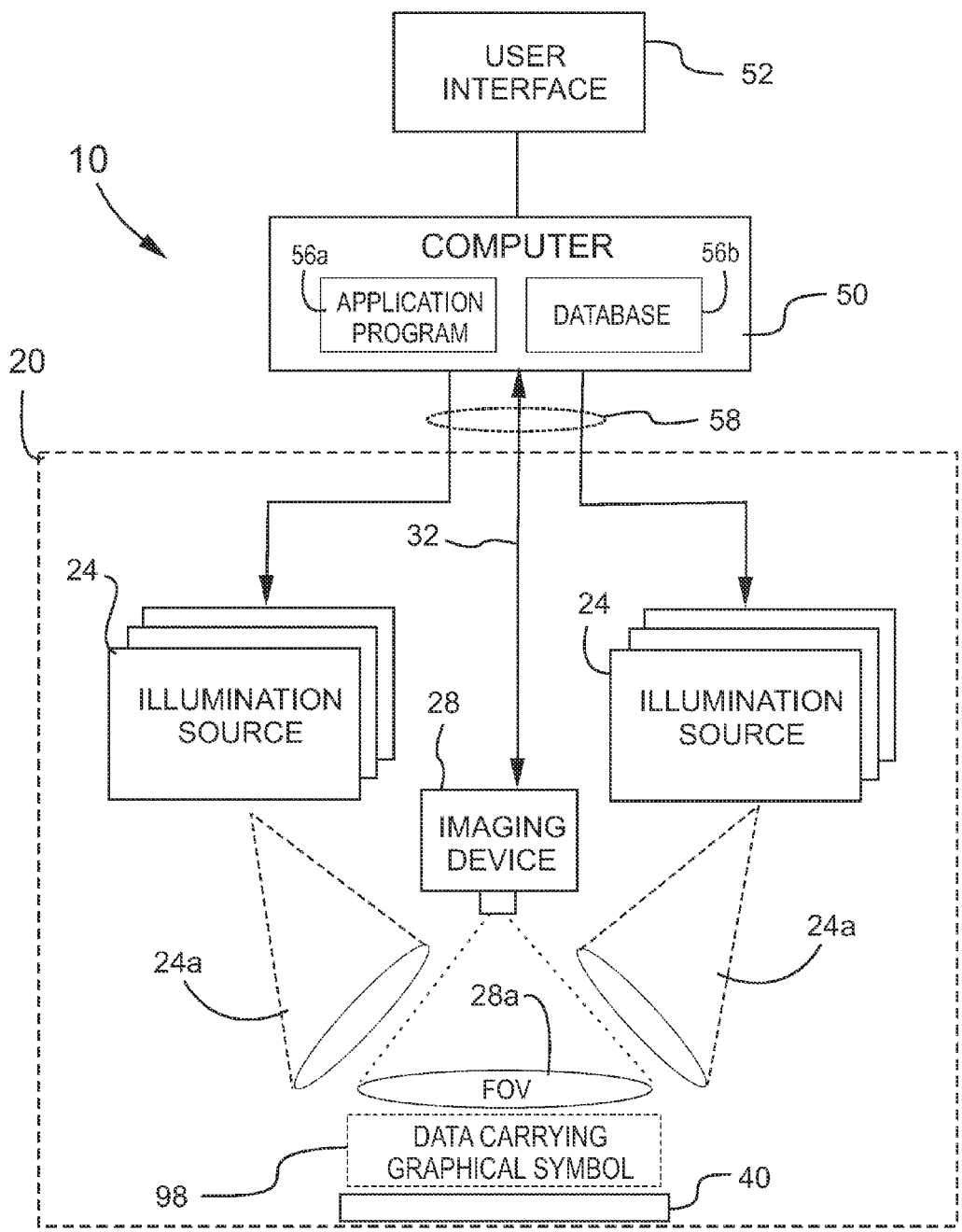
FIG. 1 depicts a high level generalized block diagram of a self-configuring verifier apparatus in accordance with the present invention.
Figure 2:
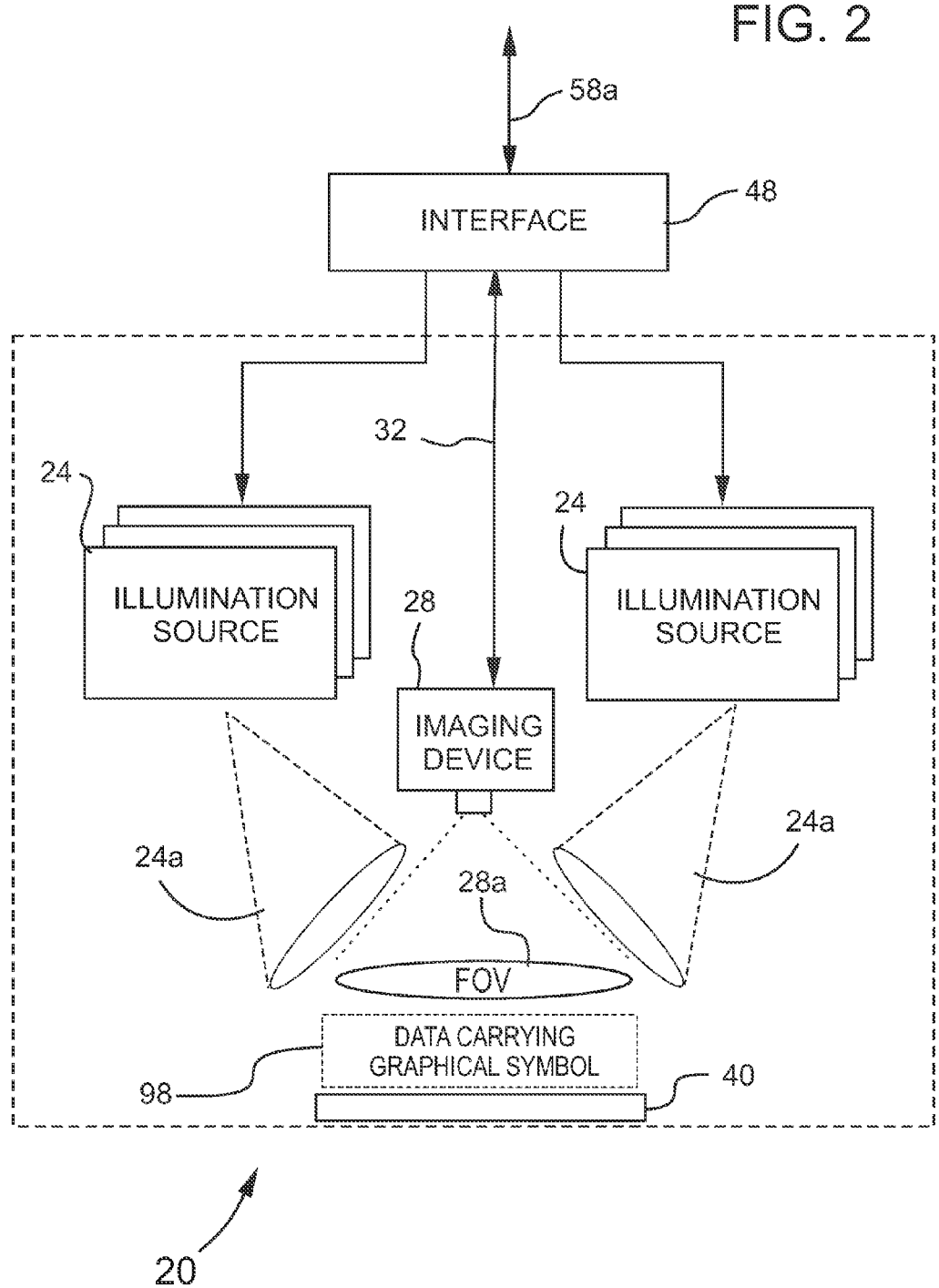
FIG. 2 provides a block diagram of an embodiment of an illumination and imaging portion of a verifier of the invention, structured to provide a number of possible illumination patterns useful for illuminating a data carrying graphical symbol.

PARTIAL LIST OF REFERENCE NUMERALS 10, 10a, 10b—self-configuring verifier apparatus
14—computer and interface portion
20—illumination and imaging portion
24—illumination source(s)
24a—incident illumination wave (beam of light)
26—operative coupling
28—imaging device
28a—field-of-view (FOV)
30—housing or chassis
32—(first) operative coupling
40—support surface
48—interface or interface module
50—computer
52—user interface (generalized)
54—network interface
56a—application program
56b—database
58, 58a—(alternate) operative coupling
98—data carrying graphical symbol

DETAILED DESCRIPTION OF EMBODIMENTS OF THE INVENTION

It is important to establish the definition of a number of descriptive terms and expressions that will be used throughout this disclosure. The term 'illumination setup' is to be broadly defined and preferably include using pre-defined information to determine which of a plurality of illumination sources must be activated for imaging and evaluation activities. Importantly, the use and application of illumination setup information will yield a required 'illumination pattern' that may be employed to yield a standardized evaluation and verification result. For example, if a total of 8 illumination sources are available, with each structured to be individually activated, an illumination pattern may be established by activating a pre-defined sub-set of these illumination sources. It should also be noted that the term 'activated', when referring to one or more available illumination sources, may simply result in a source being turned on or lighted. Alternately, an 'activation' may be much more involved, possibly causing a respective illumination source to be positioned (e.g., changing elevation and or adjusting the angle of incident light), as well as causing a specific pre-defined intensity and or wavelength to be established. In addition, intensity adjustment may be provided in numerous fashions. For example, one preferred illumination source may be comprised of a plurality of discrete and individually controllable lighting elements, possibly of varying or selectable wavelengths, such as high intensity light emitting diodes (LEDs). With such an arrangement, the intensity and or wavelength may be set by selectively turning on only a portion of the plurality of discrete lighting elements available in a respective illumination source. Additionally, a dimming feature and means may be employed, for example, by controlling the current through elements such as LEDs. The expression 'data carrying graphical symbol' is to be defined as any symbol or combination of symbols that can be decoded to yield fixed and repeatable information therefrom. Examples of well known data carrying graphical symbols, or components thereof, include 1-dimensional barcodes, 2-dimensional barcodes, matrix type symbols, transitional/diagnostic barcodes, etc. A set of 'pre-defined illumination patterns', as defined above, may most preferably be stored within an accessible data storage means, such as a computer database. With such an arrangement, once the symbology of a graphical symbol has been determined, an illumination pattern and possibly other associated setup information, typically related to or defined by well known industry standards, may be automatically accessed and applied. It may further be noted that the term 'standardized evaluation and verification' may be assumed to indicate one or more criteria or requirements, typically defined and established by industry associations and or committees thereof. These are often published as what may be termed formal written industry standards for, in this case, evaluation and verification criteria associated with data carrying graphical symbols. Other important terms and definitions will be provided, as they are needed, to properly define the present invention and its associated novel characteristics and features.

Referring now to the drawings, FIG. 1 provides a high level generalized functional block diagram of a possibly most preferred embodiment of the present invention. As shown, a data carrying graphical symbol 98 may be placed within a field-of-view (FOV) 28a of an imaging device 28. Preferred imaging devices 28 may include cameras, CCD units, etc. When a data carrying graphical symbol 98 is placed within the FOV 28a, say by being placed upon a support surface 40 as depicted in FIGS. 1 through 3B, one or more illumination sources 24 may be activated—producing one or more incident illumination waves 24a (e.g., beam of light/illumination). The activating of the illumination sources 24 results in an establishing of a possibly required illumination pattern.

Importantly, in the most preferred embodiments of the present invention, illumination sources 24 would each have a unique spatial location about the data carrying graphical symbol. Accordingly, each illumination source 24 may be arranged for producing an incident illumination wave 24a, causing an illuminating of the graphical symbol at a pre-determined angle and from a pre-determined (relative or selectable) direction. Many physical arrangements of illumination sources, with each possibly provided by one or more illumination elements, are providable and certainly considered within the scope of the present teachings and claims.

The present invention may be specifically structured to employ any of a plurality of possible illumination patterns, wherein the particular pattern(s) utilized are automatically selected and employed, based on the determined symbology of the data carrying graphical symbol. It may be noted that the determination of the symbology of the data carrying graphical symbol will preferably be ascertained via any available techniques and methodologies, such as effecting a first-read decode. Alternately, image recognition techniques, such as digital signal processing, may be employed that may actually yield the symbology without a full decode of the data carrying graphical symbol. As understood by skilled individuals, a series of varying methods or algorithms may be employed to 'search' for the symbology of which the graphical symbol of interest may be a member.

Regardless of how the symbology is determined, an imaging of the graphical symbol will most preferably be involved, resulting in the storing of discrete image related data, such as pixels of bit mapped information, which may be subsequently processed to yield standardized evaluation and verification results, as required.

When initial imaging is being conducted, before the symbology of the data carrying graphical symbol is known, the illuminating of the one or more data carrying graphical symbols 98 placed within the FOV 28a of imaging device 28 may be effected using any possible illumination pattern, including:

a) a maximum illumination pattern, wherein all of the plurality of illumination sources are activated;

b) an initial default illumination pattern, wherein less than the maximum available illumination sources are initially activated;

c) a previous illumination pattern, such as the most recently utilized (and possibly still required) illumination pattern; and/or d) an illumination pattern wherein the number of illumination sources activated represents an increase over a previous number of activated illumination sources utilized.

Accordingly, when referring to an initial illumination pattern, the term 'default illumination pattern' may mean any initially utilized pattern (which may be repeatable and known), or alternately may indicate a first utilized illumination pattern that may simply be the illumination pattern that was last employed for either a first-read decode and or an evaluation of a previous graphical symbol of interest.

Returning to FIG. 1, a computer 50 may be preferably included for controlling the operation of the self-configuring verifier apparatus 10. Importantly the computer 50 may include an application program 56a (when processor based) and a storage structure such as a database 56b. The application program 56a, and operational features and functions thereof, will be more fully discussed when referring to FIGS. 4, 5 and 6. The database 56b may be stored in any suitable non-volatile memory or storage structure, such as a portion of an available ROM or FLASH memory. The database 56b may most preferably include information such as which illumination pattern or patterns should be utilized for imaging and standardized evaluation and verification of a specific symbology. In addition to a plurality of possible illumination patterns, other setup parameters required for standardized evaluation and verification activities may also be housed within the database 56b and also possibly accessed based on symbology. Referring again to FIG. 1, it is important to understand that the illumination and imaging portion 20 of the self-configuring verifier apparatus 10 may be provided in many functionally equivalent structures. For example, an embodiment of the illumination and imaging portion 20 depicted in FIG. 2 may include an interface portion 48 for operatively coupling the illumination and imaging portion 20 to a control means, such as a computer and interface portion 14 of FIGS. 3A and 3B. As illustrated, the embodiment depicted in FIG. 3A may include a computer 50 and utilize an operative coupling 58, which may be provided as an internal cable or coupling means. Accordingly, at least two coupled functional units, along with a power source/supply (not illustrated), may be provided within a single housing, and therefore yield a fully self-contained, and at least partially self-configuring, verifier apparatus 10a. In a possibly most preferred single unit embodiment, the verifier apparatus 10a of FIG. 3A may be portable and easily moved from one location to another.

Figure 3A:
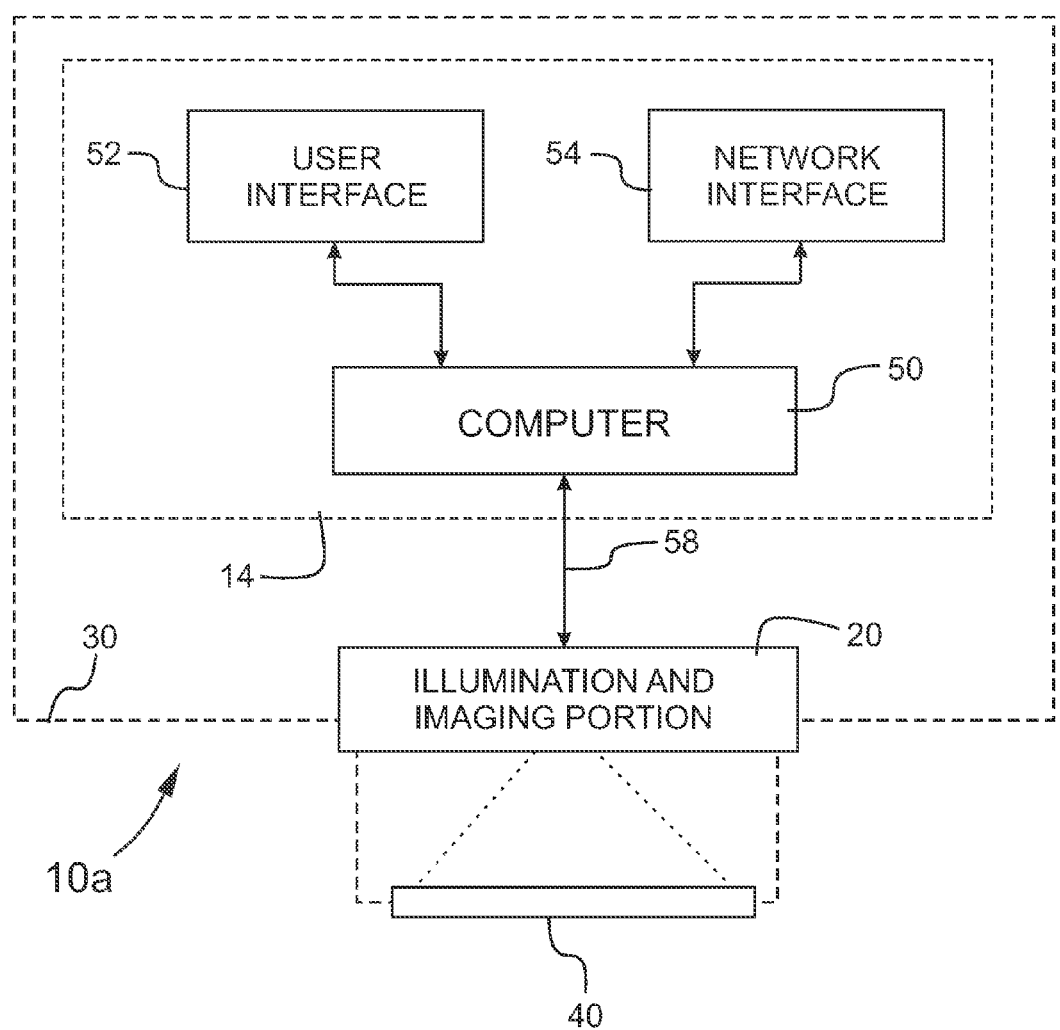
FIG. 3A depicts an embodiment of a fully self-contained and self-configuring verifier including an illumination and imaging portion, a user interface, and a computer or control unit, which may be housed in a single chassis or housing.
Figure 3B:
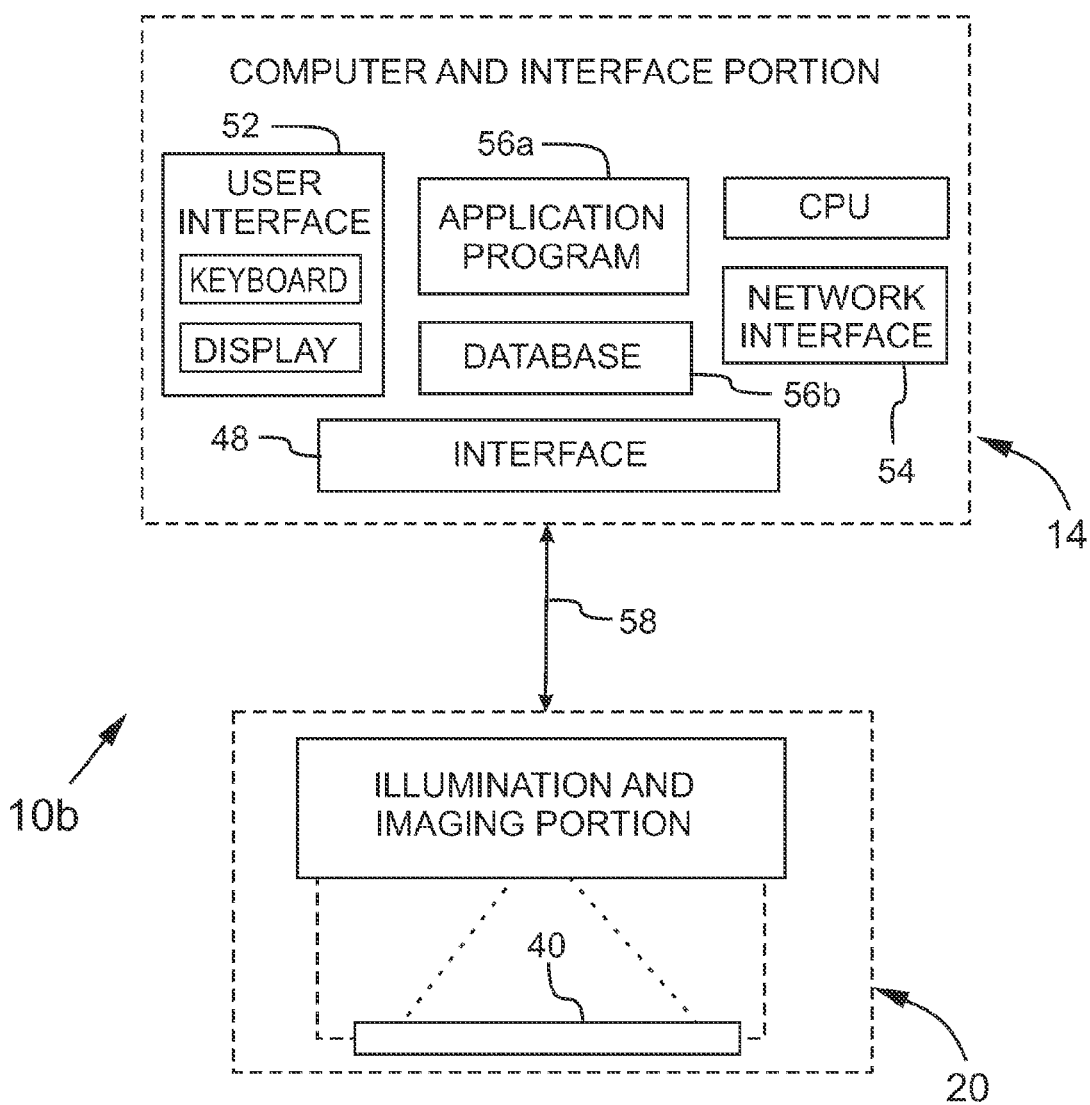
FIG. 3B provides an alternative embodiment to that depicted in FIG. 3A, wherein the illumination and imaging portion is provided as a separate unit that is coupled to a computer and interface portions.

As depicted in FIG. 3B, should the self-configuring evaluation and verification functions of the present invention be needed at a location that may already include a computer, such as a ubiquitous portable or desktop personal computer, a self-configuring verifier apparatus 10b may most conveniently and efficiently embodied by utilizing the available computer. As shown in FIG. 3B, two operatively coupled units, including the computer and interface portion 14 (e.g., the personal computer) and the illumination and imaging portion 20, may be provided as separate function sub-units, possibly best embodied having separate housings (depicted with dotted lines). As clearly shown in FIG. 3B, the operative coupling 58 may be provided between each of the sub-units. Again, preferable operative couplings may be hardwired or wireless.

The verifier apparatus embodiments of FIGS. 3A and 3B may include a variety of user interfaces 52. One preferred arrangement, such as suggested by FIG. 3B, may utilize a standard keyboard and display of an available personal computer. Other possible user interface alternatives may be provided by touch-sensitive display devices and or voice based audio interfaces (not illustrated), which are known to skilled persons. For a variety of reasons, the computer 50 may also include a network interface 54, which may be provided by hardwired or wireless means. The network interface 54 may enable a wide range of functions to be provided, including:

a) supporting the collecting, reporting, archiving, etc., of standardized evaluation and verification results;

b) enabling illumination patterns and possible other setup related information to be downloaded and or updated;

c) linking a plurality of self-configuring verifier apparatus to a central control and or monitoring location, possibly with user interface 52 functions moved to or replicated at the monitoring location; and d) other providable functions and features.

Figure 4:
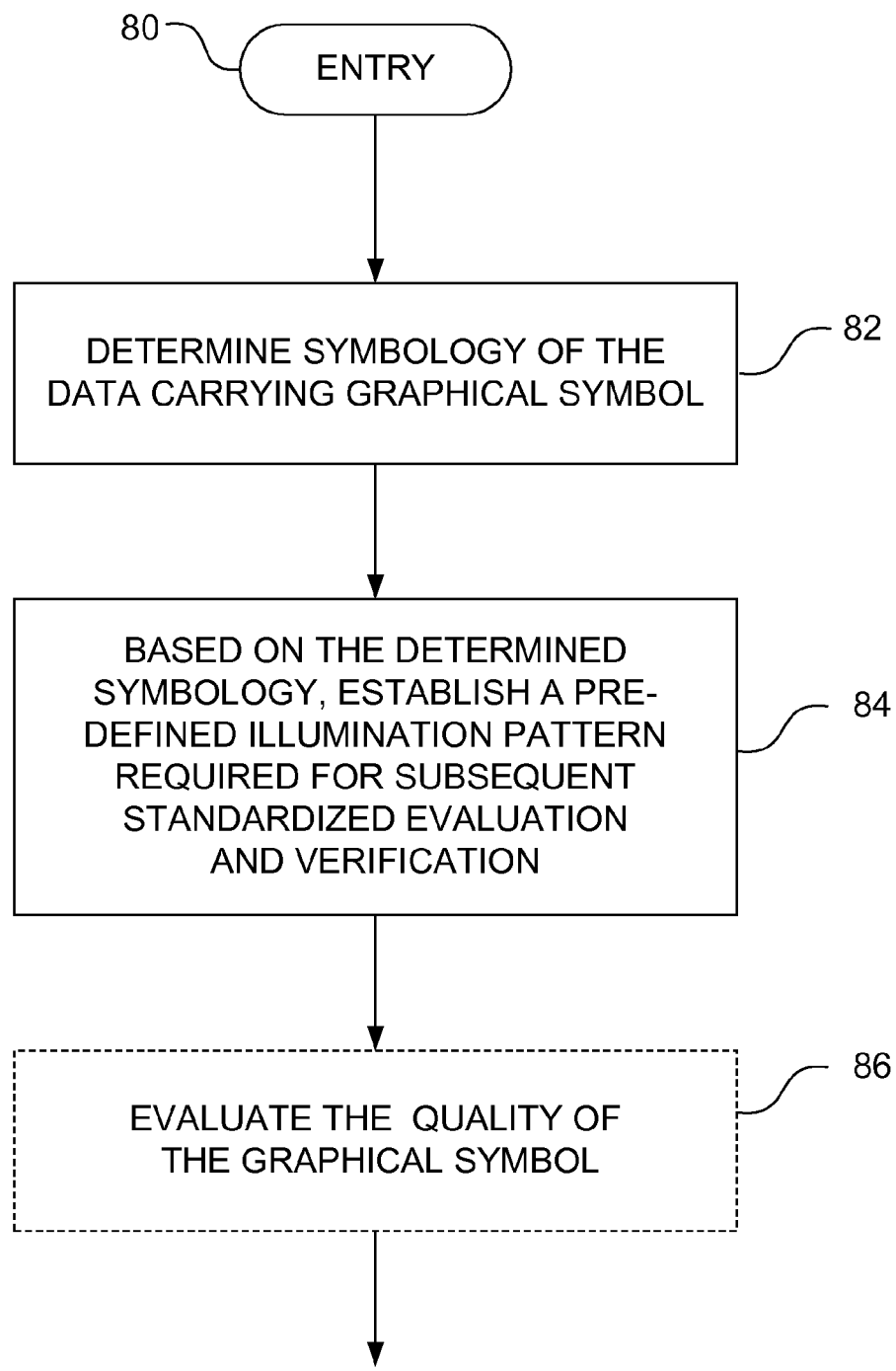
FIG. 4 provides a high-level flowchart diagram of a most basic method of configuring a verifier for evaluating and reporting print quality of a data carrying graphical symbol in accordance with the present invention.
Figure 5:
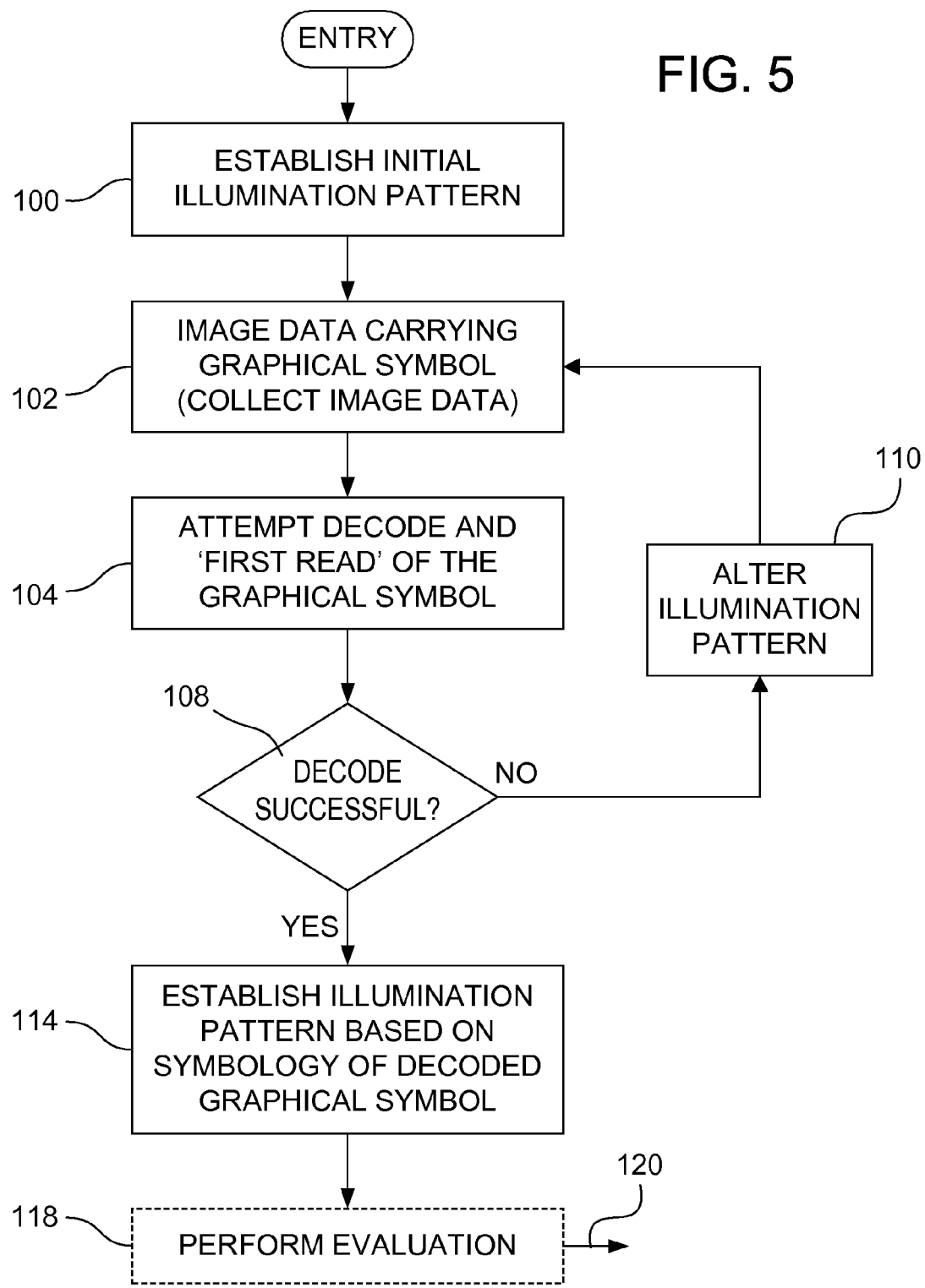
FIG. 5 is a more detailed flowchart of an embodiment of a preferred method of the invention that is consistent with the basic method of FIG. 4.
Figure 6:
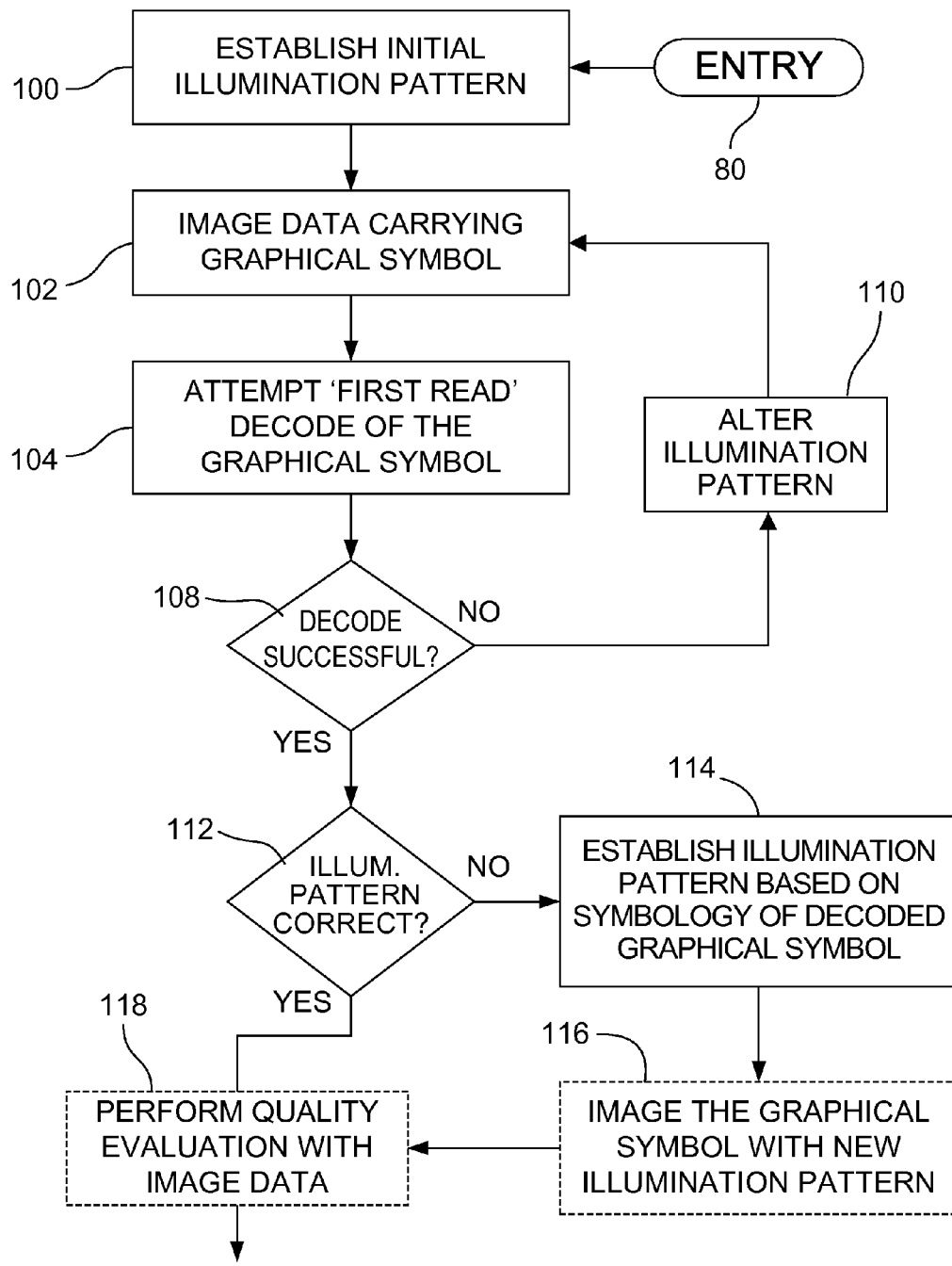
FIG. 6 provides yet another possible embodiment of a method of the present invention wherein efficiency is considered.

Turning now to FIGS. 4 through 6, preferred methods of the present invention will be discussed, with others clearly implied or providable by skilled individuals upon a careful review of this disclosure. Beginning with FIG. 4, provided is a high-level flowchart diagram of a most basic method of configuring a verifier apparatus in accordance with the invention. Upon entry at 80, the symbology of a data carrying graphical symbol is determined at 82. The symbology may be determined by any possible means/method available. However, a possibly most preferable embodiment of the verifier apparatus 10 may simply determine the symbology of the graphical symbol via a first-read decode. Once the symbology has been determined at 82, a pre-defined illumination pattern that is associated with the determined symbology may be established at 84. Accordingly, the specific pre-defined illumination pattern selected and employed is based on a determination of the symbology to be evaluated and verified, possibly based on standardized criteria and or specifications. Next, at 86 the evaluation and verification activities may be conducted, as required.

Turning to FIG. 5, a more detailed embodiment of a preferred method of the invention, which is consistent with the basic general method of FIG. 4, is illustrated. As shown, upon entry at 80 an initial or default illumination pattern may be established at 100. At 102 an imaging of the data carrying graphical symbol occurs, with one or more symbology determining activities conducted at 104. For example, as explicitly indicated at 104, a first-read decode of the graphical symbol may be attempted. If it is determined at 108 that the decode was not successful (and more importantly that the symbology has not been determined), at 110 the initial or current illumination pattern may be altered and set to another possibly preferable illumination pattern, and the loop consisting of 102, 104, 108, and 110 may be repeated until it is determined at 108 that a successful decode has been realized. Upon a successful decode, and the determining of the symbology of the imaged graphical symbol, at 114 the required illumination pattern is established. For example, upon a successful first-read decode, the method may call for the accessing of a data structure, such as a local or remote database, with information retrieved that is useful for, at minimum, establishing the pre-defined and possibly required illumination pattern. Once this illumination pattern is established, the method may continue with evaluation and verification activities conducted at 118, which may require additional imaging and or processing activities.

Turning to FIG. 6, yet another possible embodiment of the method of the invention is illustrated, again at a high level. Upon entry at 80 an initial illumination pattern is established at 100, with imaging of the data carrying graphical symbol realized at 102. Preferably image related data, such as discrete digital image data, has been stored at 102. At 104, a symbology determining activity such as a first-read decode is attempted. As understood by skilled individuals an analyzing of the discrete image related data may lead to a first-read decode or other result yielding the symbology of the data carrying graphical symbol. If the symbology determining activity does not yield the needed symbology at 108, the loop of 110, 102, 104, and 108 may again be repeated as discussed above when referring to FIG. 5.

However, with the embodiment of FIG. 6, upon a successful determining of the symbology of the graphical symbol of interest, and a possible accessing of a suitable previously established data structure (e.g., a database), a determination is made at 112 as to whether the recent imaging at 102 was in fact conducted with the required pre-defined illumination pattern. If so, then the currently stored image data may be employed, for example at 118, to perform standardized evaluation and verification activities, or what ever processing and reporting may be needed. Should however at 112 it be determined that the previous imaging did not utilize the required illumination pattern, then at 114 the required illumination pattern is established, with the data carrying graphical symbol re-imaged at 116 before processing is provided, as required, at 118.

As understood by skilled persons, a suitable data containing structure, such as well known database means, may be provided to hold the pre-defined illumination patterns. For example, a database that is housed within a computer or computing means of the invention may most preferably be employed. That said, it is certainly possible that it may be advantageous for one or more reasons for the database to be remotely located, at a location other than the location of the imaging and verifying activities. For example, if the database is not provided at the location wherein the verifier apparatus 10 is employed, the network interface 54 of FIGS. 3A and 3B may be utilized to establish a communication link with a remote system wherein the needed data structure (e.g., database) is located.

While there have been described herein a plurality of the currently preferred embodiments of the means and methods of the present invention, those skilled in the art will recognize that other and further modifications may be made without departing from the invention. For example, when considering the structure of the embodiments disclosed in FIGS. 2 through 3B, which are consistent with the generalized embodiment of FIG. 1, yet other acceptable architectures and associated methods of operation, may certainly be provided. As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. A method of automating the establishing of an illumination pattern useful for standardized imaging and evaluating of at least one data carrying graphical symbol, the method including the steps of:
   a) determining the symbology of the data carrying graphical symbol; and
   b) establishing a pre-defined illumination pattern by activating at least one illumination source of a plurality of available illumination sources, with the pre-defined illumination pattern selected based on the determined symbology of the data carrying graphical symbol;
   c) with the established pre-defined illumination pattern, based on the determined symbology, employable for imaging and evaluating the quality of the data carrying graphical symbol using the required pre-defined illumination pattern needed for standardized evaluation and verification.

2. The method as recited in claim 1, wherein the step of determining the symbology involves realizing a first-read decode, including the steps of:
   a) activating at least one of the plurality of available illumination sources;
   b) attempting a decode of the data carrying graphical symbol to yield the symbology of the graphical symbol; and
   c) repeating step-a and step-b, such that when an attempted decode fails with a presently employed illumination pattern, a different illumination pattern is established and employed, until one of:
      i) a decode is achieved; and
      ii) all available illumination patterns have been exhausted.

3. The method as recited in claim 1, wherein upon a determining of the symbology, an additional step is included for accessing an available storage device to determine the required pre-defined illumination pattern for the determined symbology, to be established and utilized for subsequent standardized evaluation and verification activities.

4. The method as recited in claim 1, wherein the step of determining the symbology of the data carrying graphical symbol includes:
   a) imaging the data carrying graphical symbol, causing the storing of discrete image related data;
   b) analyzing the discrete image related data for at least one of:
      i) determining a first-read decode of the data carrying graphical symbol; and
      ii) employing image recognition techniques to determine the symbology without a full first-read decode being realized.

5. The method as recited in claim 4, wherein the step of illuminating the data carrying graphical symbol based on the determined symbology is realized by:
   a) using the determined symbology for accessing a data storage structure;

b) reading setup information from the data storage structure, including information related to which illumination sources are to be activated; and c) activating the required illumination sources, thereby establishing the pre-defined and required illumination pattern.

6. The method as recited in claim 5, wherein the data storage structure is provided by a database accessible using a local computer.

7. The method as recited in claim 6, wherein the database is a local database, housed within at least one data storage structure, of the local computer.

8. The method as recited in claim 1, wherein an additional step is provided for an evaluating of the data carrying graphical symbol, with the evaluating activities conducted after the pre-defined and required illumination pattern is established.

9. A method of automating the establishing of an illumination pattern useful for imaging, evaluating, and verifying at least one data carrying graphical symbol, the method including the steps of:

a) illuminating at least one data carrying graphical symbol using one of:
 i) a maximum illumination pattern, wherein all of a plurality of illumination sources are activated;
 ii) a default illumination pattern, wherein less than the maximum available illumination sources are activated;
 iii) a previous illumination pattern;
 iv) an illumination pattern wherein the number of illumination sources activated represents an increase over a previous number of activated illumination sources;
 v) an illumination pattern selected from a pre-defined plurality of illumination patterns, wherein each pre-defined illumination pattern of the plurality of available illumination patterns provides for at least one illumination source being activated and at least one illumination source being deactivated;

b) attempting a decode of the data carrying graphical symbol;

c) if a decode is not achieved in step-b, repeating step-a and step-b, as required, including an adjusting of the illumination pattern and re-attempting a decode, until one of the following occurs:
 i) a decode is achieved with the symbology of the data carrying graphical symbol determined, and continuing to step-d; or
 ii) all available pre-defined illumination patterns have been tried with no decode being achieved, with a resulting error indication is generated and reported, and the method is terminated;

d) doing at least one of:
 i) determining if the decode was achieved with the required pre-defined illumination pattern for that symbology; and
 ii) determining that the decode was achieved with an illumination pattern different from the required pre-defined illumination pattern, and subsequently establishing the required illumination pattern and re-imaging the data carrying graphical symbol.

10. The method as recited in claim 9, wherein an additional step is provided for analyzing stored image information, including discrete image data of the data carrying graphical symbol, yielding a standardized evaluation and verification result.

11. The method as recited in claim 9, wherein the step of illuminating the graphical symbol using the required pre-defined illumination pattern involves accessing a data structure containing setup and configuration information.

12. The method as recited in claim 11, wherein the accessing of illumination pattern information involves accessing a local database of a computer to which the illumination sources are operatively coupled and responsive.

13. The method as recited in claim 9, wherein the illuminating of the graphical symbol with a required illumination pattern is established by an activating of at least one illumination source, with the activating of each illumination source including at least one of:

a) enabling the illumination source, with the illumination source having a unique and fixed spatial location about the data carrying graphical symbol for illuminating the graphical symbol at a pre-determined angle and direction; and b) adjusting, as required, the intensity of illumination produced by each enabled illumination source.

14. A method for fully automating the illuminating of a data carrying graphical symbol by establishing a required illumination pattern that must be utilized to yield a standardized evaluation and verification result, the method comprising the steps of:

a) determining a first-read decode of the data carrying graphical symbol by:
 i) activating at least one of a plurality of available illumination sources, and thereby causing an establishing of an initial illuminating pattern;
 ii) imaging the data carrying graphical symbol and attempting the first-read decoding of the graphical symbol, and
 iii) if a decode is not successful, repeating step-i and step-ii, until one of a first-read decode is achieved or all available pre-defined illumination patterns employable have been exhausted;

b) if a first-read decode is achieved,:
 i) continuing and employing a pre-defined illumination pattern, which is selected based on the symbology of the decoded graphical symbol, for imaging the graphical symbol and causing a storing of discrete image data captured with the required illumination pattern illuminating the graphical symbol; and
 ii) performing a standardized evaluation and verification of the print quality of the graphical symbol by processing the captured image data.

15. The method as recited in claim 14, wherein the step of selecting and establishing the pre-defined illumination pattern for imaging the graphical symbol and causing a storing of image data, involves accessing a database, based at least in-part on the determined symbology of the decoded data carrying graphical symbol.

16. The method as recited in claim 14, wherein the illuminating of the data carrying graphical symbol results in the illuminating of at least one of:
a) a linear 1-dimensional barcode symbol;
b) a 2-dimensional barcode symbol; and
c) a matrix style barcode symbol.

17. The method as recited in claim 16, wherein each included data carrying graphical symbol that is within the field-of-view of the verifier is one of:
a) illuminated with the same illumination pattern; and
b) illuminated with a required illumination pattern based on the respective determined symbology of each included data carrying graphical symbol placed within a field-of-view of the verifier.

* * * * *